United States Patent [19]

Schotter

[11] Patent Number: 4,978,413
[45] Date of Patent: Dec. 18, 1990

[54] IN-LINE FILAMENT CLEANER AND ADHESIVE APPLICATOR

[75] Inventor: Daniel K. Schotter, Tucson, Ariz.

[73] Assignee: Hughes Aircraft Company, Los Angeles, Calif.

[21] Appl. No.: 385,026

[22] Filed: Jul. 25, 1989

[51] Int. Cl.$^5$ .................. B65H 54/04; B05C 3/12; B05C 3/172

[52] U.S. Cl. ................... 156/446; 156/169; 156/281; 156/578; 427/163; 427/434.6; 118/125; 118/420; 118/424

[58] Field of Search ........... 156/169, 281, 425, 429, 156/446, 578; 427/163, 299, 434.6, 434.7; 118/125, 420, 424

[56] References Cited

U.S. PATENT DOCUMENTS

| | | | |
|---|---|---|---|
| 2,037,744 | 4/1936 | Van Derhoef | 156/281 X |
| 3,148,102 | 9/1964 | Eakins et al. | 156/169 X |
| 3,460,628 | 8/1969 | Tankersley | 156/169 X |
| 3,681,185 | 8/1972 | Gelb | 156/169 X |
| 4,394,203 | 7/1983 | Bompard | 156/425 X |
| 4,610,402 | 9/1986 | Corbett et al. | 156/425 X |
| 4,626,306 | 12/1986 | Chambrier et al. | 118/420 X |

*Primary Examiner*—Michael W. Ball
*Assistant Examiner*—Jeff H. Aftergut
*Attorney, Agent, or Firm*—C. D. Brown; R. M. Heald; W. K. Denson-Low

[57] ABSTRACT

An in-line filament cleaner and adhesive applicator for an optical fiber (10) which is to be wound onto a canister (22) used as a missile data link, for example, has a first tank (14) containing a cleaning solvent (16), a second tank (18) containing a liquid adhesive (38), and pulleys (24, 26, 28, 34, 36) for moving the fiber (10) through tank (14) to be cleaned along an air path for drying, and through tank (18) where adhesive is applied. An adhesive thickness gauge (20) insures adhesive does not exceed a given maximum and a guid tube (40) directs the adhesive coated fiber at a predetermined angle for winding on the canister (22).

9 Claims, 2 Drawing Sheets

IN-LINE FILAMENT CLEANER AND ADHESIVE APPLICATOR

BACKGROUND OF THE INVENTION

1. Field of the Invention

The present invention relates generally to winding a filament pack, and, more particularly, to inline apparatus for cleaning and applying adhesive to an optical fiber while it is being wound onto a bobbin or canister.

2. Description of Related Art

Filaments such as wire or optical fibers are utilized in certain airborne vehicles, such as a missile, as a data link. In such a case, a length of optical fiber is wound onto a bobbin or canister, one end of which is connected to electrical apparatus aboard the missile and the other end of which is connected to control apparatus at the launch site. On launch, the optical fiber unwinds from the missile canister to maintain the data link.

It is the usual process to apply an adhesive to the fiber during winding of the filament stack on the canister in order to maintain geometric integrity of the wound stack during storage. Previous adhesive application methods have involved either spraying of the adhesive over each layer of fiber as it was applied to the canister, or, alternatively, using a syringe applicator with a closed "needle-like" die (e.g., pressureless die). Spraying techniques have been found to have inherent problems in providing consistent even coverage and are relatively time consuming to employ. The syringe approach, on the other hand, although it provides more uniform coating and is usually quicker than spraying, does not clean the fiber nor can the fiber be removed from the applicator if this should become necessary.

It can be shown that a substantial portion of the overall cost of an optical fiber wound canister is involved in just winding the fiber onto the canister. If the adhesive can be applied onto the fiber in-line during winding, this would reduce winding costs substantially over previous techniques of applying an adhesive by either the syringe or spraying methods. Estimates indicate that these costs can be reduced by as much as 30% over the prior techniques, other factors being held the same.

Additionally, improved adhesive application consistency and ability to unwind the fiber through the applicator to correct possible winding anomalies would greatly enhance the overall ability to wind a high quality canister.

SUMMARY OF THE INVENTION

In acordance with the practice of the present invention, there is provided an in-line filament cleaning and adhesive applying apparatus which includes two tanks in a side-by-side relation, the first contains a supply of a cleaning solvent and the second a quantity of adhesive to be applied to the fiber. The fiber is first fed into the cleaning tank and over the surface of a draw pulley which moves the fiber through the cleaning solvent and across a wiper sponge impregnated with the cleaning solvent. Alternatively, an ultrasonic transducer may also be located in the solvent liquid to provide additional cleaning, if needed or desired. The fiber upon leaving the cleaning tank moves over a further pulley located in the air which acts as a drying tower as well as providing a time delay between the two tanks in order to prevent solvent carry-over into the second or adhesive tank.

On entering the adhesive tank, the cleaned fiber travels under a pair of spaced apart pulleys where it is submerged in adhesive. On leaving the adhesive tank pulleys the fiber exits via an aperture tube which serves to control the amount of adhesive allowed to remain on the fiber, the excess adhesive being allowed to drain back into the tank. A recirculating pump maintains adhesive level and prevents settling or separation of the adhesive within the tank.

On occasion it may be necessary that a portion of the fiber requires to be unwound. In this case the aperture tube is selectively releasable from the fiber to allow removal. The adhesive tank may then be bypassed to allow for cleaning of the fiber before being rewound onto a takeup spool.

A first load cell mounted adjacent the apeture tube operates to indicate the lead/lag angle between the aperture tube and the filament laydown point on the bobbin. This angle data is fed into the winding machine for updating information used for filament winding control. A further load cell supports an adhesive pulley and measures filament winding tension.

DESCRIPTION OF A PREFERRED EMBODIMENT

A data link for a missile or other airborne vehicle consists of a length of filament such as wire or preferably an optical fiber 10 which is wound onto a bobbin or canister located on board the vehicle. The leading end of the filament is interconnected with on-board control apparatus and the opposite end remains connected to other control apparatus at the launch site. On launch, the canister unwinds rapidly paying out the filament 10 throughout a predetermined distance of the vehicle flight and over which, in the case of an optical fiber, an optical signal provides control information signals from the launch site. In order to maintain fiber stack integrity during storage, for example, it is customary to cover the fiber with an adhesive such that the individual windings and layers will be adhered to each other with a predetermined force. However, the amount of adhesive that is applied must be maintained within specified limits in order to prevent too high a peel-off force being exerted on the filament which can kink or even break the filament thereby severely impairing or breaking the data link.

Prior techniques used to apply an adhesive to an optical fiber either consisted of spraying the adhesive onto the fiber, after it had been wound onto individual layers, or using a syringe for applying the adhesive. Neither of these techniques are completely satisfactory. Spraying has been accompanied with difficulties in producing uniform and consistent coverage, and the syringe technique, although somewhat more consistent and quicker, does not provide cleaning or the ability to remove the fiber from the applicator, if that becomes necessary.

Also, in the case of optical fibers, they are frequently stored for substantial lengths of time on a bobbin so that it is desirable before winding onto another bobbin or canister for use in a missile, for example, that surface cleaning be effected. Otherwise, adhesive may not adhere to the fiber in a consistent and uniform coating. Also, foreign matter particulates may inadvertently become wound into the fiber pack which may at a later time cause damage or increase optical signal attenuation within the completed canister.

Figure 1:
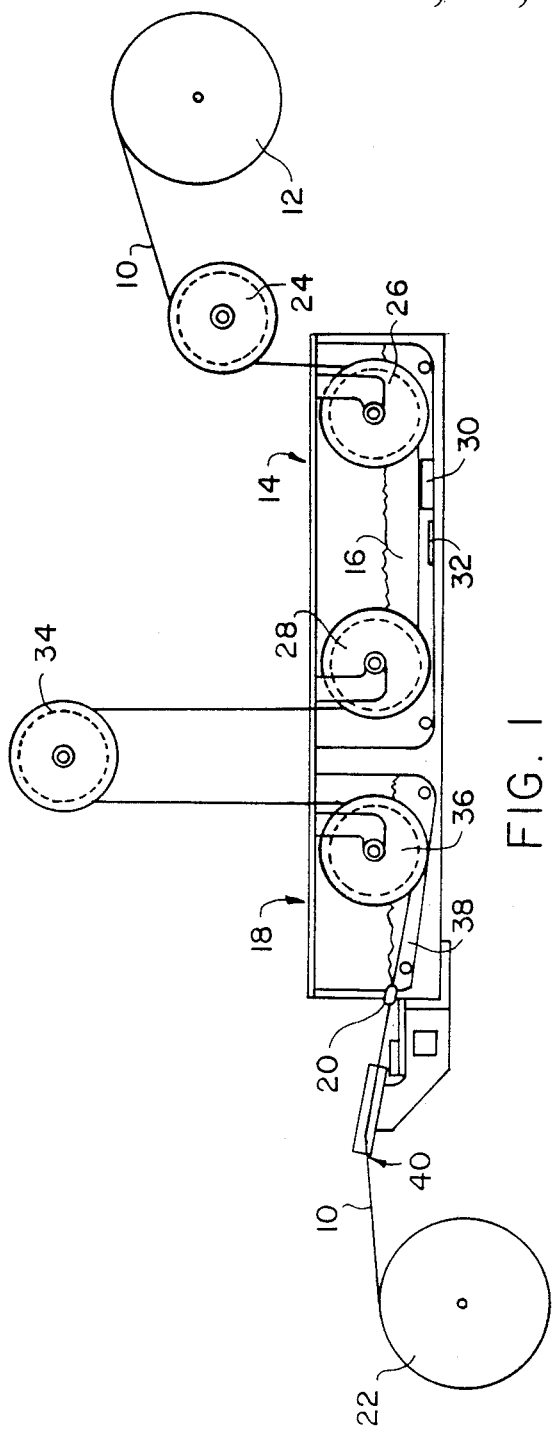
FIG. 1 is a side elevational, partially schematic view of the cleaner and adhesive applicator of the present invention.

Turning now to the drawing and particularly FIG. 1 thereof, fiber 10 which is conveniently stored on a cylindrical roll 12 is fed by a pulley system to be described first through a cleaning tank 14 where the fiber is cleaned by exposure to a suitable liquid solvent 16. Following cleaning the fiber is then air dried and passes through a second tank 18 where it is coated with an adhesive. On the fiber leaving the adhesive tank, it moves through an adhesive thickness determining means 20 before winding receipt on a canister 22.

More particularly, the optical fiber filament 10 on leaving the storage roll 12 first passes over a guiding and drive pulley 24 and then down into the solvent 16 in tank 14 where it is moved via a pair of spaced apart pulleys 26 and 28 to subject the fiber for a sufficient length of time to the cleaning action of the solvent. Preferably, a wiping means 30 of a soft-to-the-touch and liquid absorbent material such as a soft synthetic plastic foam or sponge, for example, is affixed to bottom of the tank and it contacts the fiber moving therepast to aid in cleaning the fiber outer surface. Optionally, an ultrasonic transducer 32 can be provided for irradiating the solvent and fiber as it moves therepast to effect ultrasonic cleaning in a known manner.

The fiber on leaving the pulley 28 is moved upwardly and out of the tank 14 onto a further pulley 34 during which the solvent evaporates into the ambient air leaving the fiber with a dry surface. Next, the fiber is moved downwardly into the tank 18 and over the guiding surface of a pulley 36 located in the adhesive tank where the fiber is immersed in a suitable liquid adhesive 38. Coated with adhesive, the fiber than moves outwardly from the tank 20 through the adhesive gauging means 20 which removes all excess adhesive from the fiber surface leaving it with a consistent and uniform adhesive coating. After gauging, the fiber leaves the tank and passes through a guide tube 40 after which it is wound onto the canister 22.

Figure 5:
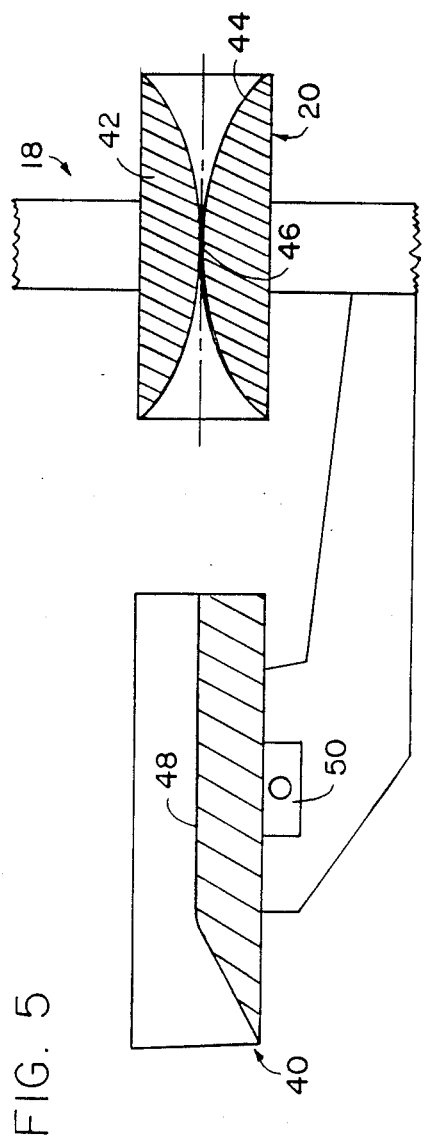
FIG. 5 is a side elevational, sectional view taken through the gauging means and guide tube.

For the ensuing details of the adhesive gauging means 20, reference is made to FIG. 5, where it can be seen to include a ceramic or hard metal member 42 having a longitudinally extending passageway 44 with a central minimum cross-section point 46 that opens up to enlarged exit and entrance points. The minimum diameter at 46 is larger than the diameter of the optical fiber 10 by a predetermined amount. As the fiber passes therethrough, any adhesive material adhering to the outer surface of the fiber beyond the maximum desired limit (i.e., minimum diameter of 46) will be removed. By this action, not only is the desired maximum amount of adhesive on the fiber maintained within permissible limits, but also the excess adhesive tends to be moved along the fiber covering any bare spots (i.e., free of adhesive).

The guide tube 40 also shown in FIG. 5 includes a longitudinally extending V-groove 48 which has an outer end portion tapering downwardly somewhat. The guide tube is affixed to an arm 50 which can be adjustably located as desired to position the angle of fiber winding feed to the roll 22.

Figure 2:
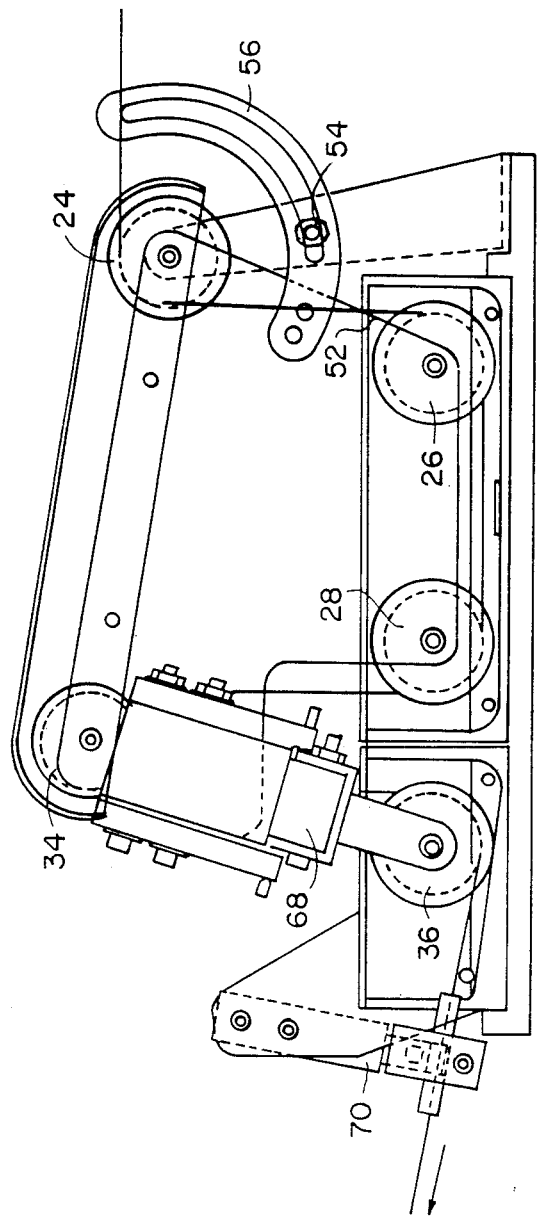
FIG. 2 is a side elevational partially sectional view of the cleaner and applicator of the present invention.
Figure 3:
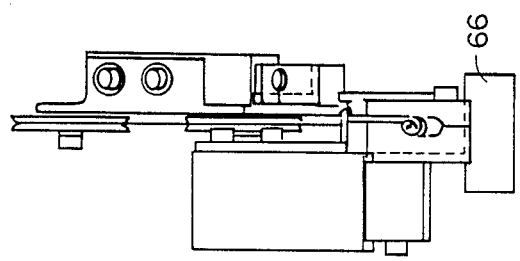
FIG. 3 is an end elevation of the apparatus of FIG. 2.

For the detailed pulley mounting arrangement description reference is made especially to FIG. 2. The pulleys 26, 28, 34 and 36 are all cantilever mounted onto a single plate 52 which, in turn, is rotatably mounted about the center axis of the pulley 24 such that the pulleys just enumerated can be swung as a unit for lowering the pulleys into or raising them out of the solvent and adhesive tanks 14 and 18, as desired. Removal of the pulleys from the tanks may be required to clean the tanks, or during repair or replacement of the pulleys, for example. The precise positioning of the pulleys can be secured by appropriate adjustment of a locking nut 54 onto an arc plate 56.

Figure 4:
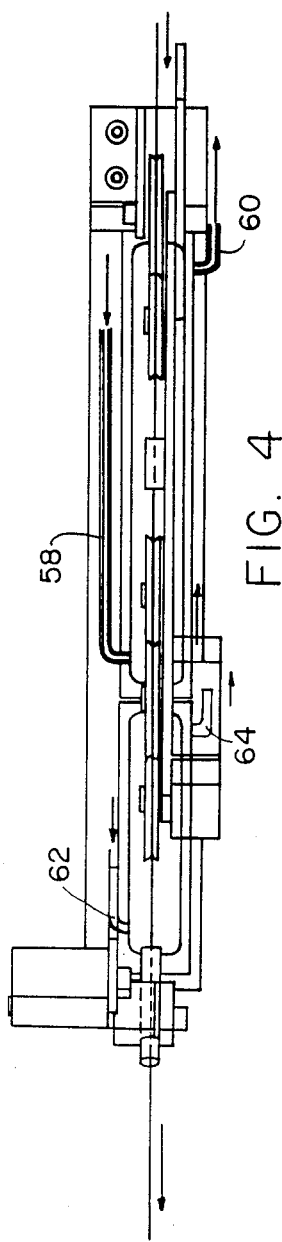
FIG. 4 is a top plan view of the apparatus of FIG. 2 showing a fiber passing therethrough.

As seen best in FIG. 4, the solvent 16 circulates through the chamber 14 by admission from a pressure line 58 at the front or forward end of the tank 14 and is removed for recirculation and repressurizing through an exit line 60 at the tank back end. In this manner, the fiber as moves forwardly through the tank will be washed by the moving solvent and a better cleaning will be achieved.

Similarly, the adhesive circulates through the tank 18 by admission at the front (62) and removal for recirculating and repressurizing from the rear of the tank (64). Optionally, immediately adjacent the aperture tube there may be located a recovery basin 66 with an interconnecting tube to the adhesive tank. In operation, all excess adhesive removed by the aperture tube is then returned to the tank 18 for recirculation and use.

A load cell 68 is provided in supporting relation to the pulley 36 for measuring fiber winding tension. Similarly, a further load cell 70 supports the aperture tubes 40 and measures the fiber lead/lag angle to the layout point on the canister 22. This latter measurement is important for fiber winding control.

What is claimed is:

1. Apparatus for in-line cleaning of and application of adhesive to an optical fiber being wound from a storage roll onto a missile cannister, comprising:

a first tank for containing a quantity of liquid cleaning solvent;

first pulley means for moving the fiber along a path in contact with the liquid cleaning solvent;

second pulley means located in the ambient air for receiving the fiber on leaving the cleaning solvent;

a second tank for containing a quantity of a liquid adhesive;

third pulley means for moving the fiber received from the second pulley means along a path through the liquid adhesive, said first, second and third pulley means being mounted on a member which is, in turn, pivotally mounted to swing the first and third pulley means into and out of the cleaning solvent and adhesive, respectively; and gauging means for receiving the fiber after it has passed through the liquid adhesive, smoothing the adhesive to a prescribed thickness and applying consistently over the fiber surface.

2. Apparatus as in claim 1, in which the gauging means includes a generally tubular member having a restricted orifice for receiving the fiber with adhesive thereon.

3. Apparatus as in claim 1, in which there is further provided a guide tube for receiving the fiber as it leaves the gauging means and directing the fiber toward the canister.

4. Apparatus as in claim 3, in which means are provided for adjustably positioning the guide tube relative to the canister.

5. Apparatus as in claim 3, in which load cell means supports the guide tube for measuring a fiber lead/lag angle to a layout point on the canister.

6. Apparatus as in claim 1, in which the gauging means is mounted to the second tank.

7. Apparatus as in claim 1, in which means are provided for moving a quantity of liquid adhesive through the second tank in a direction opposite to the path of fiber movement.

8. Apparatus as in claim 1, in which means are provided for moving liquid cleaning solvent through the first tank in a direction opposite to that of the fiber movement therethrough.

9. Apparatus for in-line cleaning of and application of adhesive to an optical fiber being wound from a storage roll onto a missile canister, comprising:

a first tank for containing a quantity of liquid cleaning solvent;

first pulley means for moving the fiber along a path in contact with the liquid cleaning solvent;

second pulley means located in the ambient air for receiving the fiber on leaving the cleaning solvent;

a second tank for containing a quantity of a liquid adhesive;

third pulley means for moving the fiber received from the second pulley means along a path through the liquid adhesive;

gauging means for receiving the fiber after it has passed through the liquid adhesive, smoothing the adhesive to a prescribed thickness and applying consistently over the fiber surface; and a guide tube disposed for receiving the fiber as the fiber leaves the gauging means and directing the fiber toward the canister, the guide tube including a generally V-shaped grooved extending along the tube bore, said groove having a first generally straight-line portion extending from the tube entrance end and a second portion location at the tube exit end which is angularly disposed to the first groove portion.

* * * * *